(12) United States Patent
Coq et al.

(10) Patent No.: US 11,289,740 B2
(45) Date of Patent: Mar. 29, 2022

(54) RECHARGEABLE LEAD-ACID BATTERY WITH COMPOUND AND SLUDGE LEVELING AND SHEDDING CAPABILITY

(71) Applicant: International Business Machines Corporation, Armonk, NY (US)

(72) Inventors: Marc H. Coq, Hopewell Junction, NY (US); Richard John Fishbune, Rochester, MN (US); Mark Maresh, Wake, NC (US); Eric Swenson, Pine Island, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 16/406,836

(22) Filed: May 8, 2019

(65) Prior Publication Data
US 2020/0358136 A1 Nov. 12, 2020

(51) Int. Cl.
| | | |
|---|---|---|
| *H01M 6/50* | (2006.01) | |
| *H01M 10/12* | (2006.01) | |
| *H01M 4/73* | (2006.01) | |
| *H01M 10/42* | (2006.01) | |
| *H02J 7/00* | (2006.01) | |
| *H01M 50/10* | (2021.01) | |

(52) U.S. Cl.
CPC ............ *H01M 10/12* (2013.01); *H01M 4/73* (2013.01); *H01M 10/4214* (2013.01); *H01M 10/4235* (2013.01); *H01M 50/10* (2021.01); *H02J 7/007* (2013.01)

(58) Field of Classification Search
CPC ............ H01M 10/12; H01M 10/4214; H01M 10/4235; H01M 50/10; H01M 4/73; H02J 7/007
See application file for complete search history.

(56) References Cited

U.S. PATENT DOCUMENTS

| | | |
|---|---|---|
| 4,405,697 A | 9/1983 | Rowlette |
| 5,098,799 A | 3/1992 | Bowen et al. |
| 5,963,008 A | 10/1999 | Cordeiro et al. |
| 10,003,069 B2 | 6/2018 | Yamauchi et al. |
| 2014/0004401 A1 | 1/2014 | Wirtz |
| 2018/0047964 A1 | 2/2018 | Natesh et al. |
| 2018/0226696 A1* | 8/2018 | Coq ................... H01M 10/488 |

FOREIGN PATENT DOCUMENTS

| | | | |
|---|---|---|---|
| CN | 108199098 A | 6/2018 | |
| DE | 3733581 A1 | 5/1988 | |
| EP | 2462642 A1 | 6/2012 | |
| WO | WO-9741610 A1 * | 11/1997 | ............ H01M 50/70 |
| WO | 2011016986 A1 | 2/2011 | |

* cited by examiner

*Primary Examiner* — Jane J Rhee
(74) *Attorney, Agent, or Firm* — Cantor Colburn LLP; Tihon Poltavets

(57) ABSTRACT

A rechargeable lead-acid battery is provided. The rechargeable lead-acid battery includes a casing, a grid structure and an electro-mechanical assembly. The casing defines an interior configured to accommodate plates and a supply of fluid that is electrically reactive with the plates to generate electricity. The grid structure is interposed between lower edges of the plates and a bottom of the casing. The electro-mechanical assembly is coupled with the grid structure and operable to agitate the grid structure.

19 Claims, 3 Drawing Sheets

RECHARGEABLE LEAD-ACID BATTERY WITH COMPOUND AND SLUDGE LEVELING AND SHEDDING CAPABILITY

BACKGROUND

The present invention generally relates to rechargeable lead-acid batteries, and more specifically, to a rechargeable lead-acid battery with compound and sludge leveling and shedding capability.

A lead-acid battery includes lead sulphate plates and an electrolytic fluid, such as acid, that contacts each of the plates. The electrical energy produced by a discharging lead-acid battery can be attributed to energy released when strong chemical bonds of water molecules are formed from H+ ions of the acid and O2− ions. Conversely, during charging the lead-acid battery acts as a water-splitting device. In the charged state, the chemical energy of the lead-acid battery is mostly stored in the acid.

SUMMARY

Embodiments of the present invention are directed to a rechargeable lead-acid battery. A non-limiting example of the rechargeable lead-acid battery includes a casing, a grid structure and an electro-mechanical assembly. The casing defines an interior configured to accommodate plates and a supply of fluid that is electrically reactive with the plates to generate electricity. The grid structure is interposed between lower edges of the plates and a bottom of the casing. The electro-mechanical assembly is coupled with the grid structure and operable to agitate the grid structure.

Embodiments of the present invention are directed to a rechargeable lead-acid battery. A non-limiting example of the rechargeable lead-acid battery includes a casing, a grid structure, an electro-mechanical assembly and a controller. The casing defines an interior configured to accommodate plates and a supply of fluid that is electrically reactive with the plates to generate electricity. The grid structure is interposed between lower edges of the plates and a bottom of the casing. The electro-mechanical assembly includes a mixer disposed in contact with the grid structure and a motor to which the mixer is connected and which is configured to drive bi-directional rotation of the mixer to thereby agitate the grid structure. The controller is configured to activate the motor when a charging condition of the battery is in effect.

Embodiments of the invention are directed to rechargeable lead-acid battery. A non-limiting example of the rechargeable lead-acid battery includes a casing, a grid structure, an electro-mechanical assembly and a controller. The casing defines an interior configured to accommodate plates and a supply of fluid that is electrically reactive with the plates to generate electricity. The grid structure is interposed between lower edges of the plates and a bottom of the casing. The grid structure includes edges which are displaced from interior surfaces of the casing. The electro-mechanical assembly includes a mixer disposed in contact with the grid structure and a motor to which the mixer is connected. The electro-mechanical assembly is configured to drive bi-directional rotation of the mixer, which is accommodated by respective spaces between the edges of the grid structure and the interior surfaces of the casing, to thereby agitate the grid structure. The controller is configured to activate the motor when a charging condition of the battery is in effect.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
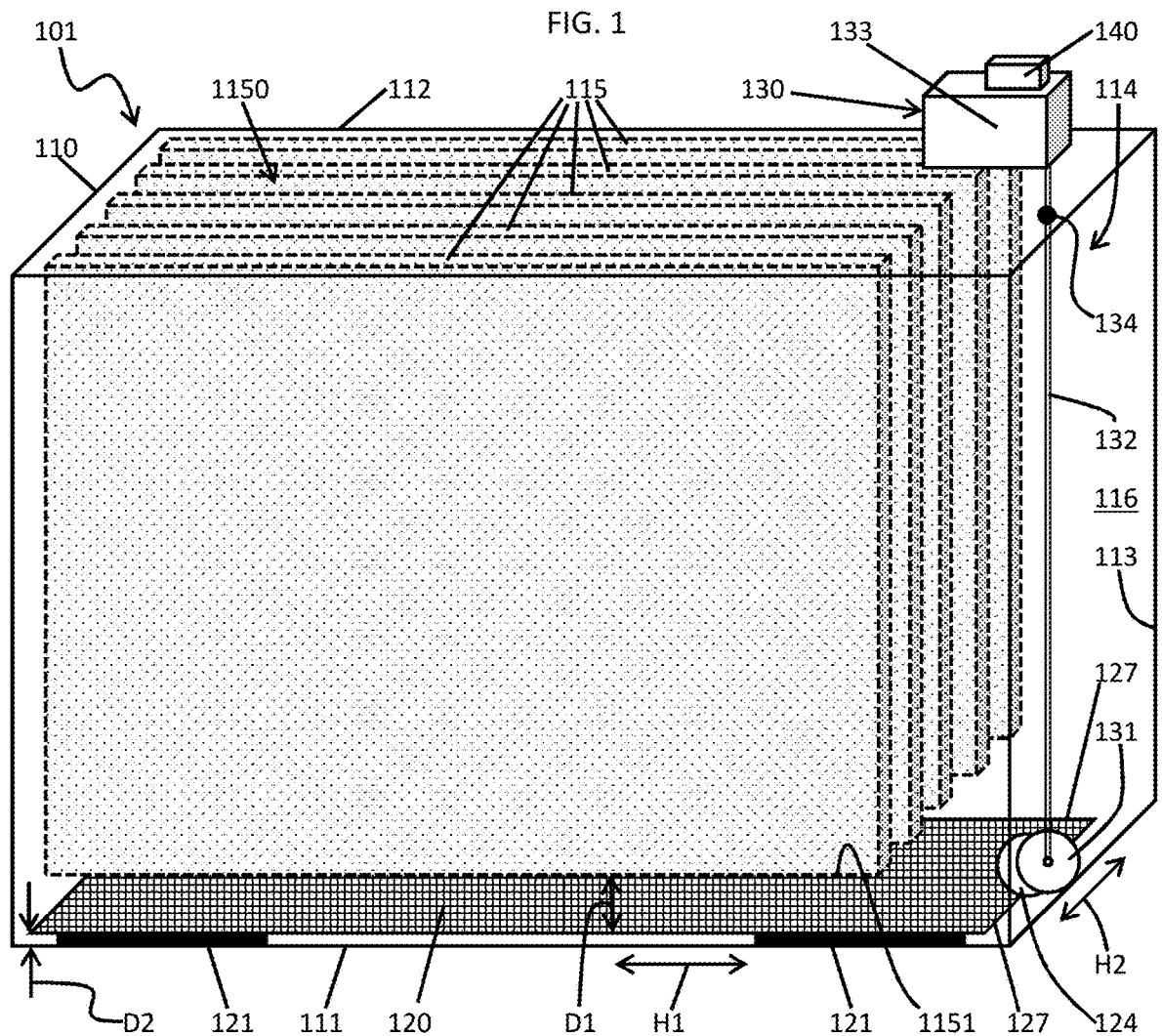
FIG. 1 is a perspective view of a rechargeable lead-acid battery in accordance with embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a rechargeable lead-acid battery includes lead sulphate plates and an electrolytic fluid, such as acid, that contacts each of the plates. The electrical energy produced by a discharge of the rechargeable lead-acid battery can be attributed to energy released when strong chemical bonds of water molecules are formed from H+ ions of the acid and O2− ions. Conversely, during charging, the rechargeable lead-acid battery acts as a water-splitting device. In the charged state, the chemical energy of the rechargeable lead-acid battery is mostly stored in the acid.

One problem with rechargeable lead-acid batteries is they shed conductive lead compounds that cause short circuits between plates. Such short circuits can subsequently cause a failure of the rechargeable lead-acid batteries.

In a given rechargeable lead-acid battery, the short circuits can be caused, in part, by an accumulation of lead compounds and sludge at the bottom of its casing and underneath lower edges of the plates. Since this accumulation can be unevenly distributed at the bottom of the casing underneath the plates, accumulated lead compounds and sludge can eventually come into contact with two or more plates at once thereby creating a short circuit and potentially leading to an early failure of the rechargeable lead-acid battery.

Turning now to an overview of the aspects of the invention, one or more embodiments of the invention address the above-described shortcomings of the prior art by providing a structural grid in the bottom of a rechargeable lead-acid battery case. As lead compounds and sludge are shed from the plates, they accumulate on the structural grid. The structural grid is thus agitated to evenly distribute the accumulated lead compounds and sludge to level the accumulated lead compounds and sludge. This serves to avoid the build-up of the accumulated lead compounds and sludge that might otherwise lead to short circuits where built-up accumulated lead compounds and sludge contact the plates. The structural grid can be agitated through optimized methods of mechanical energy and vibration, which are generated by an electronic circuit using an electric motor and a mixer.

The above-described aspects of the invention address the shortcomings of the prior art by evenly distributing the lead compound particles shed from plates of a rechargeable lead-acid battery at the bottom of the casing by means. This is achieved by an agitation of a structural grid by an electro-mechanical assembly. The even distribution makes it so that it takes longer for the lead compound particles to build up to the point of short circuiting the plates, which extends the battery life.

Figure 2:
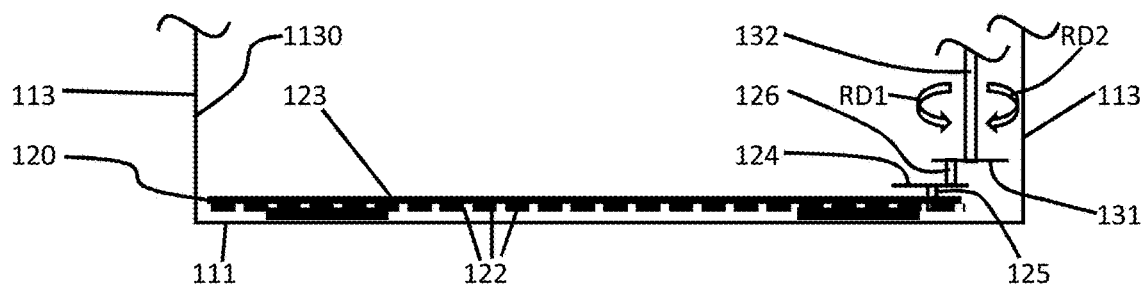
FIG. 2 is a schematic side view of components of the rechargeable lead-acid battery of FIG. 1.

Turning now to a more detailed description of aspects of the present invention, FIGS. 1 and 2 show a rechargeable lead-acid battery 101 in accordance with embodiments of the present invention. As shown in FIG. 1, the rechargeable lead-acid battery 101 includes a casing 110, a grid structure 120, an electro-mechanical assembly 130 which is configured to agitate the grid structure 120 and a controller 140.

The casing 110 is generally rectangular and includes a bottom wall 111 at the bottom of the casing 110, a top wall 112 and the top of the casing 110 and two pairs of opposed sidewalls 113 extending between the bottom wall 111 and the top wall 112. The casing 110 thus defines an interior 114 that is configured to accommodate plates 115 and a supply of fluid 116 that is electrically reactive with the plates to generate electricity. The plates 115 can be formed of lead phosphate or other similar materials and can be disposed within the interior 114 in a row in a face-to-face arrangement 1150. The fluid 116 can be an acid. It is to be understood that during the life of the rechargeable lead-acid battery 101, the reaction of the fluid 116 with the plates 115 will tend to create lead compounds and sludge that will break off from the plates 115 and settle toward the bottom wall 111.

The grid structure 120 is interposed between lower edges 1151 of the plates 115 and the bottom wall 111 and is supported at a first distance D1 below the lower edges 1151 of the plates 115 and at a second distance D2 above the bottom wall 111. Spacers 121 may be included to support the grid structure 120 in this manner. The grid structure 120 can be formed of rigid or semi-rigid material that is non-reactive with any components of the rechargeable lead-acid battery 101, including the fluid 116.

In accordance with some embodiments of the present invention, the grid structure 120 can include first bars 122 (see FIG. 2) that are substantially parallel with one another and second bars 123 (see FIG. 2) that are substantially parallel with one another and oriented transversely (e.g., perpendicularly) with respect to the first bars 122, on which the second bars 123 are seated and to which the second bars 123 are attached. In accordance with further embodiments of the present invention, the grid structure 120 can further include a circular lever plate 124, which is attached to the grid structure 120 by a pin connection 125 (see FIG. 2), and a floating pin 126 that is disposed on the circular lever plate 124.

The grid structure 120 also includes two pairs of opposed edges 127 that extend around the perimeter of the grid structure 120. The pair of opposed edges 127 along horizontal axis H1 are displaced from complementary interior surfaces 1130 (see FIG. 2) of the corresponding pair of sidewalls 113. The other pair of opposed edges 127 along horizontal axis H2 are displaced from complementary interior surfaces 1130 of the other corresponding pair of sidewalls 113.

As will be described below, an agitation of the grid structure 120 by the electro-mechanical assembly 130 is accommodated by the space between the edges 127 of the grid structure 120 and the interior surfaces 1130 of the sidewalls 113 of the casing 110.

The electro-mechanical assembly 130 includes a mixer 131 that is disposed in contact with the floating pin 126 of the circular lever plate 124 of the grid structure 120, a rod 132, a motor 133 to which the mixer 131 is connected via the rod 132 and a seal 134. The mixer 131 can be provided with a plate shape that corresponds to the shape of the circular lever plate 124. The motor 133 can be disposed at an exterior of the casing 110 whereby the rod 132 pierces the top wall 112. The seal 134 seals the portion of the top wall 112 that is pierced by the rod 132. The motor 133 can be provided as a stepper motor and is configured to drive bi-directional rotation of the mixer 131 via the rod 132 to thereby agitate the grid structure 120.

With the construction described above, the motor 133 can drive bi-directional rotations of the mixer 131 in first and second opposite rotational directions RD1 and RD2 via the rod 132. This bi-directional rotation is transmitted to the grid structure 120 by way of the floating pin 126 and the circular lever plate 124 whereby the grid structure 120 moves as a unit toward and between first and second stopping positions within the interior 114. The space between the edges 127 of the grid structure 120 and the interior surfaces 1130 of the sidewalls 113 of the casing 110 accommodate the unitary movement of the grid structure 120.

Figure 3:
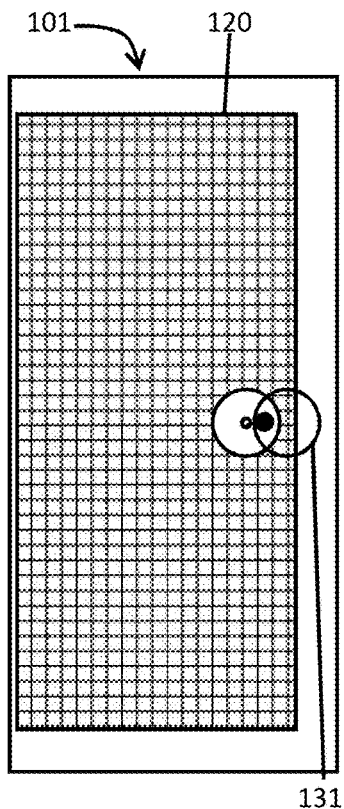
FIG. 3 is a top-down view of components of the rechargeable lead-acid battery of FIGS. 1 and 2 in an initial state.
Figure 4:
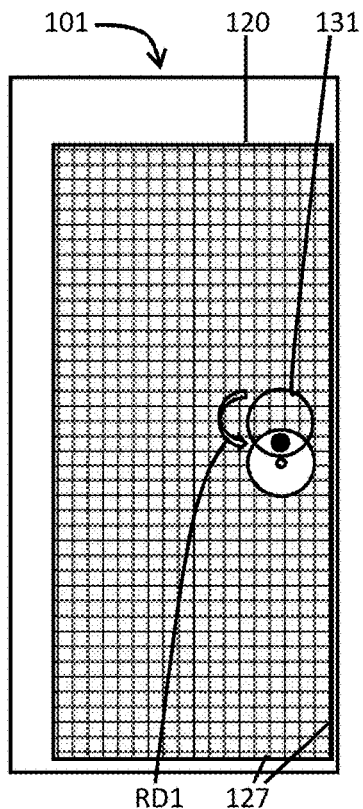
FIG. 4 is a top-down view of components of the rechargeable lead-acid battery of FIGS. 1 and 2 in a secondary state.
Figure 5:
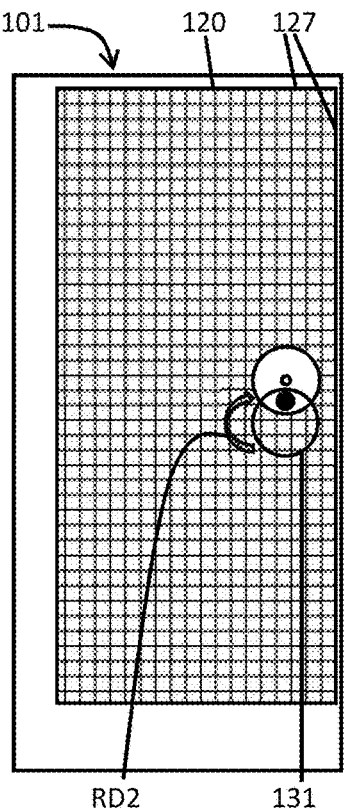
FIG. 5 is a top-down view of components of the rechargeable lead-acid battery of FIGS. 1 and 2 in a tertiary state.

With continued reference to FIGS. 1 and 2 and with additional reference to FIGS. 3-5, the unitary movement of the grid structure 120 resulting from the bi-directional rotation of the mixer 131 by the driving of the motor 133 is illustrated. As shown in FIG. 3, at an initial time, the mixer 131 and the grid structure 120 are disposed at a central or non-rotated position. As shown in FIG. 4, the motor 133 (see FIG. 1) has driven a rotation of the mixer 131 in the first rotational direction RD1 and the grid structure 120 has accordingly moved such that edges 127 at a first side of the grid structure 120 impinge or nearly impinge against complementary interior surfaces 1130 (see FIG. 2) of the sidewalls 113 of a first side of the casing 110. As shown in FIG. 5, the motor 133 (see FIG. 1) has driven a rotation of the mixer 131 in the second rotational direction RD2 and the grid structure 120 has accordingly moved back through and beyond the central or non-rotated position such that edges 127 at a second side of the grid structure 120 impinge or nearly impinge against complementary interior surfaces 1130 (see FIG. 2) of the sidewalls 113 of a second side of the casing 110. Subsequent oscillatory rotations of the mixer 131 by the motor 133 continue the back and forth unitary movement of the grid structure 120 illustrated in FIGS. 3-5.

Figure 6:
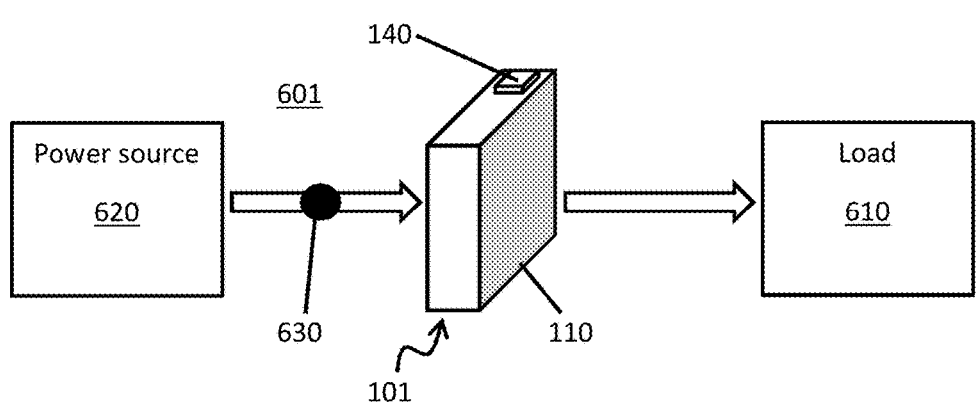
FIG. 6 is a schematic diagram of a system in which the rechargeable lead-acid battery is deployed in accordance with embodiments of the present invention.

With reference to FIG. 6, a system 601 is provided in which the rechargeable lead-acid battery 101 described above is deployed. The system 601 includes a load 610 which is receptive of electricity from the rechargeable lead-acid battery 101, a power source 620, a sensor 630 and the controller 140. The load 610 is connected to the rechargeable lead-acid battery 101 whereby the rechargeable lead-acid battery 101 provided electricity to the load 610. The power source 620 is connected to the rechargeable lead-acid battery 101 whereby the power source 620 can charge or recharge the rechargeable lead-acid battery 101. The sensor 630 can be disposed within the rechargeable lead-acid battery 101 or can be interposed between the power source 620 and the rechargeable lead-acid battery 101 to determine when a charging condition of the rechargeable lead-acid battery 101 is in effect. The controller 140 is coupled to the electro-mechanical assembly 130 and the sensor 630 and is configured to operate the electro-mechanical assembly 130 when the sensor 630 determines that the charging condition of the rechargeable lead-acid battery 101 is in effect. More particularly, the controller 140 is configured to activate the motor 133 of the electro-mechanical assembly 130 to bi-directionally rotate the mixer 131 when the sensor 630 determines that the charging condition of the rechargeable lead-acid battery 101 is in effect.

In any case, the controller 140 can direct electricity that is generated by the rechargeable lead-acid battery 101 toward the motor 133 to provide the motor 133 with power.

Figure 7:
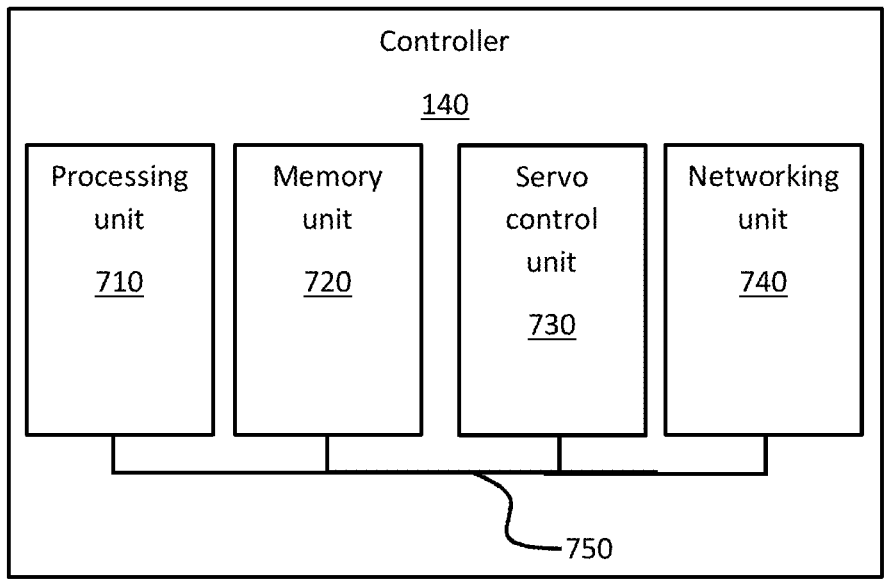
FIG. 7 is a schematic diagram of a controller of the rechargeable lead-acid battery in accordance with embodiments of the present invention.

With continued reference to FIG. 1 and with additional reference to FIG. 7, the controller 140 can include a processing unit 710, a memory unit 720, a networking unit 730, a servo control unit 740 and an input/output (I/O) bus 750 by which the processing unit 710, the memory unit 720, the networking unit 730 and the servo control unit 740 are communicative. The networking unit 730 provides for communications between the processing unit 710 and the sensor 630 or between the processing unit 710 and external computing devices. The servo control unit 740 operates the motor 133 of the electro-mechanical assembly 130 in accordance with commands generated by the processing unit 710. The memory unit 720 has executable instructions stored thereon. The executable instructions are readable and executable by the processing unit 710. The executable instructions, when read and executed by the processing unit 710, are configured to cause the processing unit 710 to operate the electro-mechanical assembly 130 as described above when the sensor 630 senses that the charging condition of the rechargeable lead-acid battery is in effect.

Figure 8:
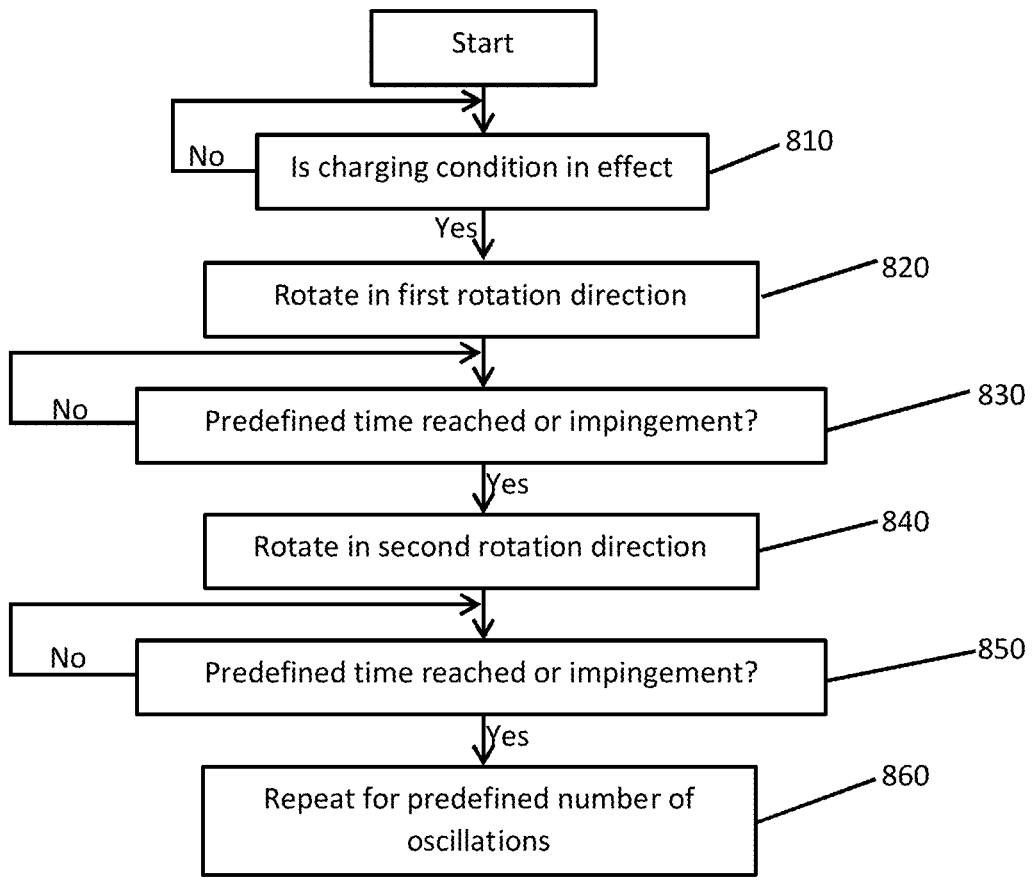
FIG. 8 is a flow diagram illustrating an operation of a rechargeable battery in accordance with embodiments of the present invention.

With reference to FIG. 8, an operation of the controller 140 and the electro-mechanical assembly 130 is provided. As shown in FIG. 8, the sensor 630 determines whether the charging condition of the rechargeable lead-acid battery 101 is in effect (810) and informs the processing unit 710 as to the status via the networking unit 730. In an event the charging condition is determined to be in effect, the processing unit 710 issues a command to the servo control unit 740 to activate the motor 133 to rotate in the first rotational direction RD1 (820). This continues for a predefined time or until the grid structure 120 impinges against the interior surfaces 1130 of the sidewalls 113 of the first side of the casing 110 (830). The processing unit 710 then issues a command to the servo control unit 740 to activate the motor 133 to rotate in the second rotational direction RD2 (840). This continues for a predefined time or until the grid structure 120 impinges against the interior surfaces 1130 of the sidewalls 113 of the second side of the casing 110 (850). The sequence repeats for a predefined number of oscillations (860).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A rechargeable lead-acid battery, comprising:
a casing defining an interior configured to accommodate plates and a supply of fluid that is electrically reactive with the plates to generate electricity;
a grid structure interposed between lower edges of the plates and a bottom of the casing; and
an electro-mechanical assembly coupled with the grid structure and operable to agitate the grid structure by vibrating the grid structure,
wherein:
the electro-mechanical assembly comprises a stepper motor at an exterior of the casing, a mixer disposed in contact with the grid structure, a rod connecting the mixer to the stepper motor and piercing the casing at a piercing location and a seal disposed to seal the casing at the piercing location, and
the stepper motor is configured to drive bi-directional rotation of the mixer via the rod.

2. The rechargeable lead-acid battery according to claim 1, further comprising:
a sensor configured to detect a charging condition of the battery; and
a controller configured to activate the electro-mechanical assembly when the charging condition of the battery is sensed by the sensor.

3. The rechargeable lead-acid battery according to claim 1, wherein the grid structure is supported at a first distance below the lower edges of the plates and at a second distance above the bottom of the casing.

4. The rechargeable lead-acid battery according to claim 3, further comprising spacers to support the grid structure at the second distance above the bottom of the casing.

5. The rechargeable lead-acid battery according to claim 1, wherein edges of the grid structure are displaced from interior surfaces of the casing.

6. The rechargeable lead-acid battery according to claim 5, wherein grid structure agitation by the electro-mechanical assembly is accommodated by respective spaces between the edges of the grid structure and the interior surfaces of the casing.

7. The rechargeable lead-acid battery according to claim 1, wherein the grid structure is rigid or semi-rigid and non-reactive with the fluid.

8. The rechargeable lead-acid battery according to claim 1, wherein the grid structure comprises:
first grid bars disposed substantially in parallel;
second grid bars disposed substantially in parallel and oriented transversely relative to the first grid bars; and
a plate attached to one or more of the first and second grid bars with a floating pin with which the electro-mechanical assembly is coupled.

9. A rechargeable lead-acid battery, comprising:
a casing defining an interior configured to accommodate plates and a supply of fluid that is electrically reactive with the plates to generate electricity;
a grid structure interposed between lower edges of the plates and a bottom of the casing;
an electro-mechanical assembly comprising a mixer disposed in contact with the grid structure and a motor to which the mixer is connected and which is configured to drive bi-directional rotation of the mixer to thereby agitate the grid structure; and
a controller configured to activate the motor when a charging condition of the battery is in effect.

10. The rechargeable lead-acid battery according to claim 9, wherein the controller activates the motor using battery generated electricity when the charging condition of the battery is in effect.

11. The rechargeable lead-acid battery according to claim 9, wherein the casing is substantially rectangular and the plates are arranged face-to-face in a row.

12. The rechargeable lead-acid battery according to claim 9, wherein the grid structure is supported at a first distance below the lower edges of the plates and at a second distance above the bottom of the casing.

13. The rechargeable lead-acid battery according to claim 12, further comprising spacers to support the grid structure at the second distance above the bottom of the casing.

14. The rechargeable lead-acid battery according to claim 9, wherein edges of the grid structure are displaced from interior surfaces of the casing.

15. The rechargeable lead-acid battery according to claim 14, wherein grid structure agitation by the bi-directional rotation of the mixer is accommodated by respective spaces between the edges of the grid structure and the interior surfaces of the casing.

16. The rechargeable lead-acid battery according to claim 9, wherein the grid structure is rigid or semi-rigid and non-reactive with the fluid.

17. The rechargeable lead-acid battery according to claim 9, wherein the grid structure comprises:
first grid bars disposed substantially in parallel;
second grid bars disposed substantially in parallel and oriented transversely relative to the first grid bars; and
a plate attached to one or more of the first and second grid bars with a floating pin the mixer is disposed in contact with.

18. The rechargeable lead-acid battery according to claim 9, wherein the motor of the electro-mechanical assembly is a stepper motor and is disposed at an exterior of the casing and the electro-mechanical assembly further comprises:
a rod connecting the mixer to the stepper motor and piercing the casing at a piercing location; and
a seal disposed to seal the casing at the piercing location, wherein the stepper motor is configured to drive the bi-directional rotation of the mixer via the rod.

19. A rechargeable lead-acid battery, comprising:
a casing defining an interior configured to accommodate plates and a supply of fluid that is electrically reactive with the plates to generate electricity;
a grid structure interposed between lower edges of the plates and a bottom of the casing, the grid structure comprises edges which are displaced from interior surfaces of the casing;
an electro-mechanical assembly comprising a mixer disposed in contact with the grid structure and a motor to which the mixer is connected and which is configured to drive bi-directional rotation of the mixer, which is accommodated by respective spaces between the edges of the grid structure and the interior surfaces of the casing, to thereby agitate the grid structure; and
a controller configured to activate the motor when a charging condition of the battery is in effect.

* * * * *